UNITED STATES PATENT OFFICE.

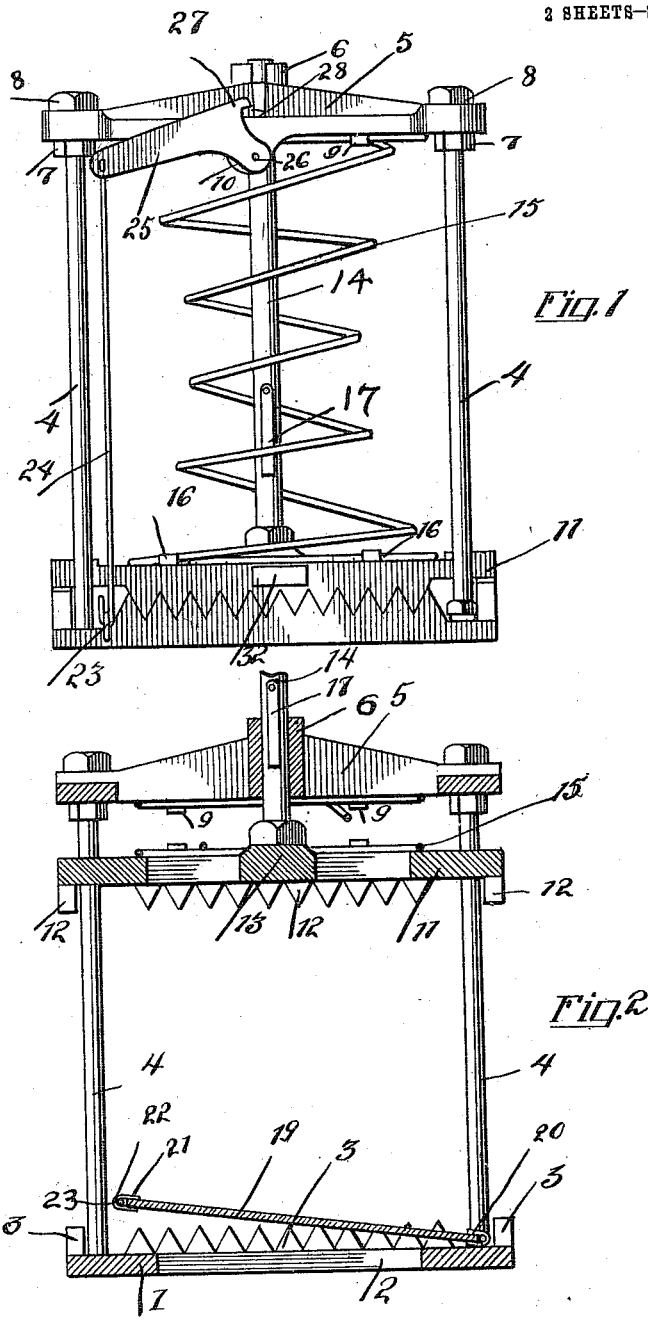

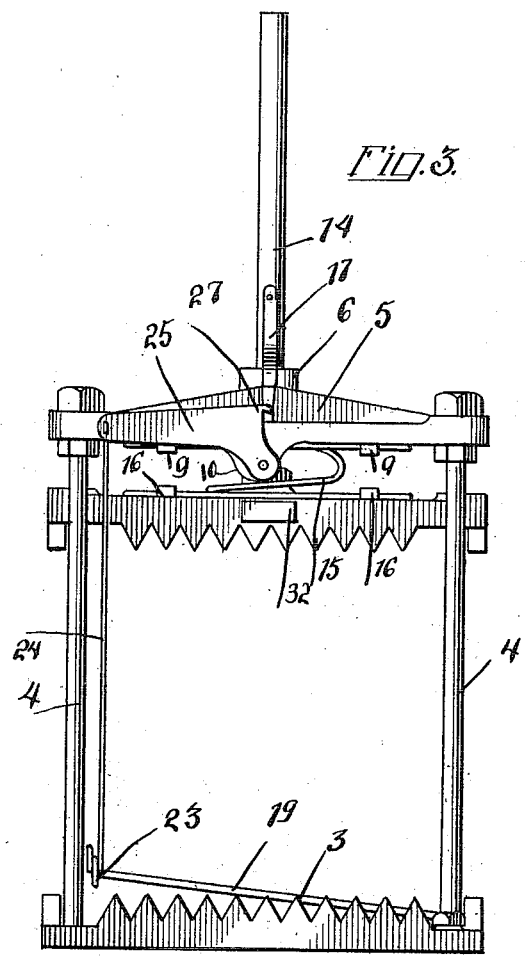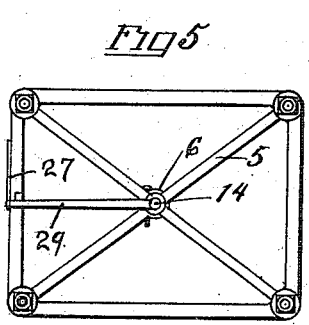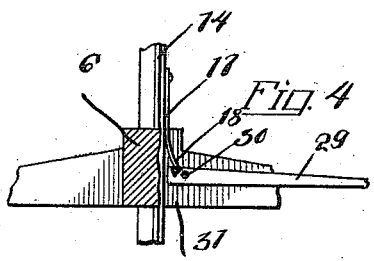

JOHN H. THARP, OF CHEROKEE, KANSAS.

ANIMAL-TRAP.

983,181. Specification of Letters Patent. Patented Jan. 31, 1911.

Application filed March 2, 1910. Serial No. 546,830.

*To all whom it may concern:*

Be it known that I, JOHN H. THARP, a citizen of the United States of America, residing at Cherokee, in the county of Crawford and State of Kansas, have invented new and useful Improvements in Animal-Traps, of which the following is a specification.

This invention relates to animal traps, and one of the principal objects of the same is to provide a trap in which the animal will be caught when entering the trap from any direction.

Another object of the invention is to provide a trap comprising a rectangular frame and rectangular jaws so that the animal in approaching the trap from any direction will be caught if it should attempt to pass through the trap.

Another object of the invention is to provide a spring jaw trap comprising a rectangular frame, jaws arranged angularly and a platform connected to the trigger for springing the trap so that the weight of an animal upon the platform in passing or in eating the bait upon the platform will spring the trap.

Another object of the invention is to provide a trap of simple construction which can be placed in the runway of an animal and arranged so that the animal must pass through the trap in order to pass and repass in the runway, the weight of the animal springing the trap.

These and other objects may be attained by means of the construction illustrated in the accompanying drawings, in which,—

Figure 1 is a side elevation of a trap made in accordance with my invention, the trap being sprung. Fig. 2 is a vertical section of the same, the trap being shown in set position. Fig. 3 is a side elevation of the same, the trap being set. Fig. 4 is a detail section and partial elevation of the central shaft and one of the members of the frame, the trigger being shown in set position. Fig. 5 is a plan view of one of the members of the frame.

Referring to the drawing, the numeral 1 designates the base member of the frame, said frame being practically rectangular in plan and having the central portion cut away, as at 2. Formed upon the upper edge of the base 1, is a series of teeth 3, said teeth being formed on each of the four sides of the frame. Secured to each corner of the base member 1 is a vertical rod or standard 4, said standards being preferably headed up upon their lower sides against the under surface of the member 1. Mounted upon the upper ends of the standards 4 is a skeleton frame member 5 comprising rectangular sides and ends and radial ribs extending to the center thereof, said ribs being provided with a central perforated boss 6. The standards 4 are held in connection with the frame member 5 by means of lock nuts 8 and adjusting nuts 7. Projecting downwardly from the ribs of the member 5 are lugs 9, and upon one of the side bars of said frame is a downwardly projecting ear 10.

The jaw member 11 of the trap is of rectangular form and provided with teeth 12 disposed in alinement with the spaces between the teeth 3 on the base member, the teeth 12 being formed upon each of the rectangular bars of the jaw. This jaw member is preferably of skeleton form and is provided with a central boss 13. Secured in the boss 13 is a sliding guide rod 14 which extends through the perforated boss 6 in the frame member 5. A spiral spring 15 is disposed between the jaw member and the upper frame member 5, said spring being held in proper relative position by means of the lugs 9 on the member 5 and similar lugs 16 on the jaw member 11. Connected to one side of the rod 14 is a spring 17, the upper end 18 of which extends outwardly slightly from the rod, as shown more particularly in Fig. 4.

A wooden floor or platform 19 is connected by a hinge 20 of suitable form to the base member 1 or two of the standards 4, said floor practically covering the space between the teeth 3 of the member 1. Connected to the free edge of the platform 19 by means of a suitable clip 21 is a wire brace 22 having a ring 23 at one end thereof. Connected to said ring 23 is a rod 24, the upper end of which is pivotally attached to a lever 25 which is pivoted at 26 to the ear 10 on the upper frame member 5. The lever 10 is provided with a projecting finger 27 which is designed to engage the beveled end 28 of the trigger 29. The trigger 29 is pivoted at 30 in a slot formed in the boss 6 and is provided with a notch 31 adapted to be engaged by the curved free end of the spring 17 when the jaw member 11 is raised against the tension of the spring 15 and the outer end of said trigger is engaged by the finger 27. Projecting outward from the jaw member 11 are finger holds 32 designed for the purpose of grasping the jaw member and raising it against the tension of the spring 15 to set the trap.

The operation of my invention may be briefly described as follows:—When the trap is set, as shown in Figs. 2 and 3, the platform or floor 19 is raised, and when the trap is placed in a runway or where rats or other animals are passing back and forth, the passageway may be banked up on opposite sides so as to be sure the animal will pass through the trap. Bait may be placed upon the platform 19, and the trap may be placed in any position for enticing the animals to eat the bait. Instead of banking up the sides of the trap, the trap may be placed in a position coming or going in any direction toward or through the trap. When an animal steps upon the platform 19 it pulls downward upon the rod 24 and releases the finger 27 from the trigger 29, thus permitting the spring 15 to force the jaw member 11 downward and catch the animal between the teeth 3 and 15.

From the foregoing it will be obvious that a trap made in accordance with my invention can be produced at low cost, is reliable and efficient for its purpose, can be formed of either sheet or cast metal for the frame parts and jaw member and can be readily assembled and the parts quickly renewed in case of breakage.

I claim:—

An animal trap comprising a rectangular frame member having upwardly projecting teeth, a rectangular top member, standards connecting the frame member with the top member, a jaw member slidingly fitted on the standards and centrally provided with a shaft slidingly fitted in the top member, a leaf spring having one end secured to the shaft, a thrust spring interposed between said top member and jaw member, a hinged platform on the frame member, a trigger pivoted to the top having one end adapted to engage with the free end of the leaf spring when the jaw is in raised position, a lever pivoted to the top to engage the opposite end of the trigger, and a connecting rod having its opposite ends secured to the platform and lever.

In testimony whereof I affix my signature in presence of two witnesses.

JOHN H. THARP.

Witnesses:
J. R. CONKLIN,
L. A. BECK.